United States Patent [19]

Basilico

[11] Patent Number: 5,220,848
[45] Date of Patent: Jun. 22, 1993

[54] METHOD AND EQUIPMENT FOR REMOTE CONTROL OF THE MOVEMENTS OF A TELECAMERA OR CINECAMERA

[75] Inventor: Paolo Basilico, Solaro, Italy

[73] Assignee: Movie Engineering S.N.C. Di Paolo Basilico & C., Milan, Italy

[21] Appl. No.: 768,261

[22] PCT Filed: Apr. 12, 1990

[86] PCT No.: PCT/IT90/00040
§ 371 Date: Nov. 19, 1991
§ 102(e) Date: Nov. 19, 1991

[87] PCT Pub. No.: WO90/12981
PCT Pub. Date: Nov. 1, 1990

[30] Foreign Application Priority Data
Apr. 20, 1989 [IT] Italy ............... 20222 A/89

[51] Int. Cl.⁵ .............. G03B 17/00; G05D 3/12; B25J 19/04
[52] U.S. Cl. ............... 74/471 XY; 352/243; 358/210; 901/47
[58] Field of Search ........ 74/469, 471 XY, 479; 352/243; 354/81; 358/210; 901/47

[56] References Cited

U.S. PATENT DOCUMENTS

| | | | |
|---|---|---|---|
| 1,708,541 | 4/1929 | House | 318/676 |
| 2,306,862 | 12/1942 | Brown | 358/210 |
| 3,205,303 | 9/1965 | Bradley | 358/210 |
| 3,916,094 | 10/1975 | Marrone | 358/210 |
| 4,233,634 | 11/1980 | Adams | 352/243 X |
| 4,673,268 | 6/1987 | Wheeler et al. | 358/229 X |
| 4,720,805 | 1/1988 | Vye | 358/229 X |

FOREIGN PATENT DOCUMENTS 1112926 8/1961 Fed. Rep. of Germany .
8801966 6/1988 Fed. Rep. of Germany .
2264298 10/1975 France .

Primary Examiner—Allan D. Herrmann
Attorney, Agent, or Firm—Young & Thompson

[57] ABSTRACT

A method and equipment for remote control of the movements of a telecamera or cinecamera (4), mounted on a motorized actuator head (3) with the possibility of movements around two axes at right angles to each other (X', Y') of PAN and TILT respectively, comprising an acquirer head (1) on which a television monitor (13) is mounted, movable around two axes at right angles to each other (X, Y) of PAN and TILT respectively, the movements of the acquirer head (1), imparted by the operator, being read by special sensors (15, 16), which send electric signals to a central control unit (2) for the instantaneous operation of the motors of the actuator head (3), in such a way that there is a direct proportion between the movements of the two heads (1, 3).

13 Claims, 2 Drawing Sheets

METHOD AND EQUIPMENT FOR REMOTE CONTROL OF THE MOVEMENTS OF A TELECAMERA OR CINECAMERA

FIELD OF THE INVENTION

The present invention concerns a method and related equipment for remote control of the movements of an object, in particular a telecamera or cinecamera.

BACKGROUND OF THE INVENTION

During the shooting of videos or films for the cinema, remote control is often necessary of the movements of the telecamera or cinecamera, by controlling the framing on a special monitor positioned near the operator.

From now on, the telecamera will mainly be mentioned, with the understanding that what is said applies equally to the cinecamera. In fact, in theory and in practice, both in the case of a telecamera (electronically recorded image) and of a cinecamera (image recorded on film), the modality of use is identical, since both these filming systems contain the possibility of remote vision of the framed image. In fact, the telecamera produces an electronic image directly, which can be visualized on a normal monitor, while for the cinecamera it is possible to use a device called an "electronic loupe", which is nothing more than a small telecamera which films the framed image, taking it from the cinecamera finder.

Special supports exist for remote control of a telecamera, which, by means of remotely controlled electric motors, make it possible for it to move around the two filming axes, called PAN (horizontal) and TILT (vertical) respectively.

Remote operation of the telecamera can be carried out in two ways: by means of a lever (commonly called "joystick") with an angular amplitude proportional to the speed of motion of the telecamera, or by means of two handwheels which move the telecamera around the respective axes of PAN and TILT, at a speed proportional to their rotation speed. The framed image is controlled on a monitor located in a fixed position near the controls.

In both these systems therefore, the shift brought about by the operator is not translated into a corresponding shift of the telecamera, but into speed of its movement; that is, no relation of position exists between the lever (in the case where commands are given by means of a lever) and the head on which the telecamera is mounted, and for this reason the operator does not manage to perceive the movement of the telecamera, even if he follows the framing of it in a monitor.

These remote control system require operators who are highly specialized in these particular controls, since an ordinary operator would experience great difficulty in producing correct movements of the telecamera, as he would be working under very different conditions from those which he was used to. In fact, the telecamera is usually mounted on heads, called "fluid" or "gyroscopic", that is with clutches or rotating masses suitable for rendering the movements of the telecamera, which is moved bodily by the operator, less interrupted and smoother, and therefore the image in the finder shift in proportion of the movements imparted.

U.S. Pat. No. 1,708,541 discloses a remote control for heavy objects, especially searchlights or guns, according to the preamble of the appended independent claims, by which it is possible to actuate the object to be moved from a distance through very small angular movements, thanks to a complex system with two motors for each axis. This remote control is not specifically designed for telecameras or cinecameras and therefore it does not foresee the possibility of mounting a monitor on the casing actuated by the operator, for controlling the shot.

FR-A-2 264 298 discloses a very particular shooting system which consists in shooting two single films, one of a life-size subject and the other of a miniature backcloth, which are then superimposed to have a whole image. The operator does not see the miniature backcloth image taken by a remote controlled camera.

SUMMARY OF THE INVENTION

The aim of the invention is to realize remote control of the movements of a telecamera or of a cinecamera, keeping the working modality of the operator completely unchanged with respect to direct command of the telecamera.

This aim has been achieved by the features recited in the body of the appended independent claims.

The acquirer head actuated by the operator is a normal cine head, movable by a lever, and provided with adjustable clutches on two axes of rotation perpendicular to each other, so as to be able to regulate the shift resistance of the head itself.

A television monitor is mounted on such head, which follows all the movements of the head and on which the image of the shot appears, that is the one the operator would see on the telecamera control monitor or int he cinecamera finder, if the latter were mounted on the head which he was operating. Therefore, the operator's working conditions are exactly the same as they would be in the case of direct operation of the telecamera or cinecamera.

The PAN and TILT movements of the acquirer head on which the telecamera or cinecamera is mounted are read by respective sensors, which send electrical impulses to a central control unit, which consequently operates the actuator head motors, identically reproducing the movement produced by the operator. These motors are obviously controlled in position and can be both step or stepless motors.

More particularly, the horizontal movement (PAN) and the vertical, movement (TILT) of the acquirer head, produced by the operator, are read by means cogged belts or toothed pulley located between the rotating parts of the heads and the corresponding sensor, which transform these movements into electric signals which control the corresponding motors of the actuator head, whose PAN and TILT movements are also obtained by means of cogged belts or toothed pulleys.

Preferably, the ratio of proportions between the angular movements of the acquirer head an the corresponding angular movements of the actuator head is 1:1, thus having an absolute correspondence between the position of the acquirer head operated by the operator and that of the motorized actuator head, on which the telecamera or cinecamera is mounted.

This ratio of proportion can, however, be varied and brought, for example, to 2:1 or 1:2 so as to obtain respectively, for instance, smoother movements with the telephoto lenses, or greater speed of action when using short optics. The passage from one ratio to another is obtained by means of commutators.

Also, it is possible, by means of special reverses, to invert the movements of the actuator head, with respect to those of the acquirer head, which is useful, for example, when the actuating head is mounted upside-down.

This system of remote control of telecamera movements, according to the invention, may be used to good effect in so-called "motion control", when it is necessary to have the telecamera carry out repeated movements, previously recorded by a processor. In this case, the PAN and TILT movements of the telecamera, which is normally mounted on a trolley with several degrees of liberty, are imparted during recording, in a way perfectly identical to the one previously described.

BRIEF DESCRIPTION OF THE DRAWINGS

Further characteristics of the invention will be explained in the detailed description which follows, referring to one of its purely exemplary, and therefore not restrictive, embodiments shown in the enclosed drawings, in which.

DETAILED DESCRIPTION OF THE INVENTION

Figure 1:
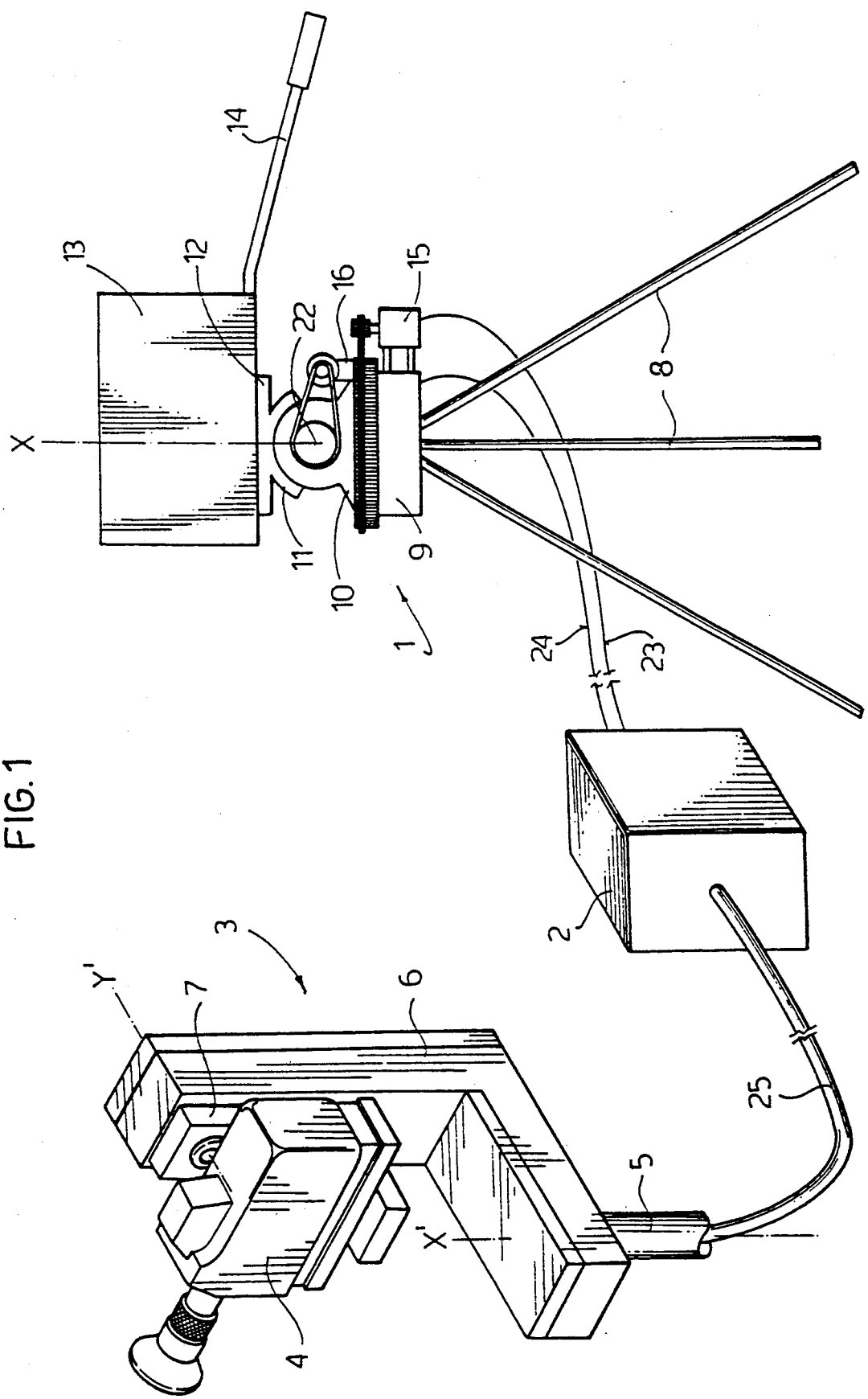
FIG. 1 is a diagrammatic view of the equipment according to the invention as a whole, showing the acquirer head, the actuator head and the central control unit.
Figure 2:
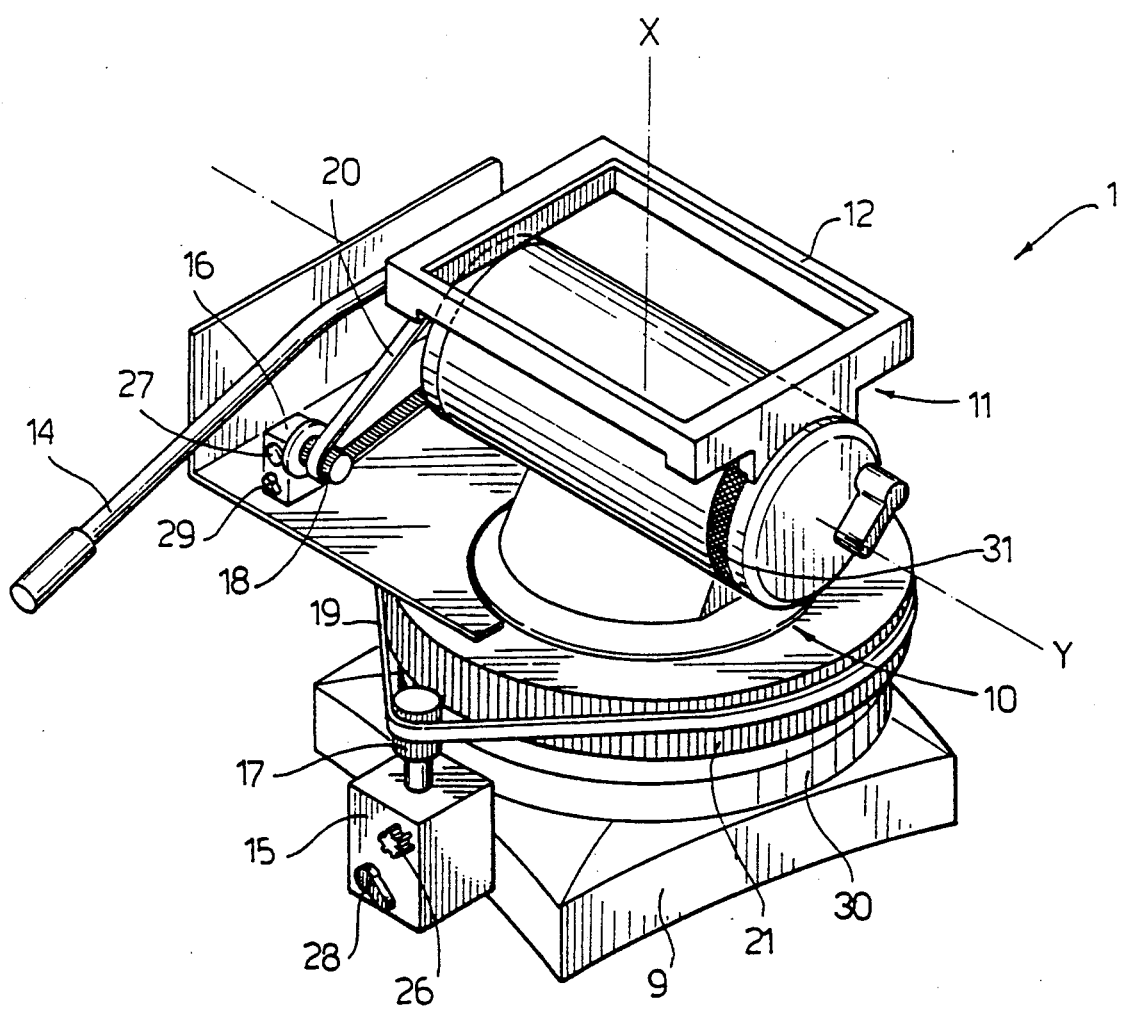
FIG. 2 is an axonometric view of the acquirer head only, on a larger scale, shown from a different angle with respect to FIG. 1.

With reference to these figures, an acquirer head is indicated with 1, which imparts commands by remote control to a telecamera or cinecamera 4, mounted on a motorized actuator head indicated with reference number 3; 2 indicates a central control unit; which establishes an electric connection between the two heads and contains the drives for the motors.

The actuator head, on which the telecamera 4 is mounted (from now on a telecamera will usually be spoken of even though what is said also applies to a cinecamera), comprises a fixed support 5, at the free end of which a first L-shaped bracket 7 is mounted, to the free flange of which a second L-shaped bracket 7 is mounted, also rotably, being of smaller size with respect to the previous one. The telecamera 4 is fixed to the free flange of the L-shaped bracket 7.

Electric motors are located in the actuator head 3, controlled in the way which will be described, which allow the bracket 6 to rotate around the support 5 and the bracket 7 to rotate with respect to the bracket 6, by means of suitable kinematic motions, consisting of cogged belts and/or gears.

When the actuator head 3 is in the vertical erect position shown in FIG. 1, the rotation around the axis of the support 5, shown in FIG. 1 with letter X', produces a horizontal movement of the telecamera 4, called PAN (horizontal panorama), while a rotation of the bracket 7 with respect to its horizontal axis of suspension, shown in FIG. 1 with Y', produces a vertical movement of the telecamera 4, called TILT (vertical panorama).

The acquirer head 1 is mounted on a tripods 8 and has support base 9 fixed with respect to the tripod 8, a part 10 rotating around a vertical axis shown with letter X, and a part 11 rotating around a horizontal axis, shown with Y and comprising, particularly, an upper plate 12, to which a television monitor 13 is fixed by rapid coupling means, shown in diagram form in FIG. 1.

The rotation of the acquirer head 1 around the PAN axis X and the TILT axis Y is imparted by the operator by means of a lever 14, fixed to the rotating part 11 of the head 1, for example to the upper plate 12.

When the lever 14 is moved horizontally, the entire movable block of the head 1 is made to rotate around the PAN axis X, while when the lever 14 is moved vertically, the mobile part 11 is made to rotate, particularly the upper plate 12 and therefore the monitor 13, around the TILT axis Y. The fluidity of the PAN and TILT movements can be appropriately adjusted by acting on the respective clutch plates 30, 31.

The PAN and TILT movements are read by respective sensors 15, 16 integral respectively with the fixed support 9 and with the part 10 of the head which rotates around the axis X, respectively. In particular, small pinions, 17, 18 respectively, project from the recording instruments and are brought into rotation during the PAN and TILT movements respectively, by the respective cogged belts 19, 20, wound around the corresponding toothed pulleys 21, 22 integrated with the movable part 10 and the movable part 11, respectively, of the acquirer head.

At each angular rotation of the corresponding small pinions 17 and 18, the sensors 15, 16 send signals, in the form of electrical impulses, to the central control unit 2, shown in diagram form in FIG. 1, by means of the respective electric cables 23 and 24. Preferably, the sensors 15, 16 are bidirectional, incremental encoders and the signals sent by them are two square waves offset at 90° to each other. The control unit 2 operates the motors (not shown in FIG. 1) foreseen in the actuator head 3, on the basis of signals received from the sensors of the acquirer head 1, to reproduce the PAN and TILT movements around the axes X' and Y'. The electrical connection between the control unit 2 and the actuator head 3 is shown in FIG. 1 by means of a cable 25.

According to the invention, therefore, there is a direct proportion between the angular PAN and TILT movements of the acquirer head imparted by the operator, and the corresponding angular PAN and TILT movements of the motorized actuator head.

If this proportion ratio is 1:1, the same angular amplitude of the actuator head corresponds to a determined angular amplitude of the acquirer head 1. The proportion ratio between the movements of the two heads can be varied, however, by means of proper commutators 26, 27, which are located respectively on the sensors 15 and 16 of the PAN and TILT movements, according to the embodiment shown in the enclosed figures.

On the sensors 15 and 16, respective reverses 28 and 29 are foreseen for inverting, when necessary, the rotation movements of the actuator head with respect to those imparted to the acquirer head 1.

With the method and equipment for remote control of the movements of a telecamera or cinecamera according to the invention, it is clear that the operator, who acts on the operating lever 14, is working under the same conditions as those in which he would work if operating the telecamera or cinecamera directly, since he moves together with the acquirer head the monitor 13, which shows the image of the subject and therefore the image which would be seen in the telecamera, if it were mounted on the acquirer head 1, and because the movements imparted are carried out exactly and instantaneously by the actuator head 3.

I claim:

1. Equipment for remote control of the movements of a telecamera or cinecamera mounted on a motorized actuator head, in such a way that it can rotate around two axes at right angles to each other (X', Y'), of PAN and TILT respectively, comprising an acquirer head movable between two right angled axes (X, Y) of PAN and TILT respectively, and means for establishing a direct proportion between movements of the acquirer head and corresponding movements of the motorized actuator head, said acquirer head including plates for adjusting respectively, the fluidity of the PAN and TILT movements, and said acquirer head being operated by means of at least a lever.

2. Equipment according to claim 1, wherein said establishing means consists of sensors which read respectively the PAN and TILT movements of the acquirer head and send electrical signals by means of a control unit for operating the motorized actuator head.

3. Equipment according to claim 2, wherein said sensors are connected to respective movable parts of the acquirer head by means of cogged belts.

4. Equipment according to claim 1, further including a television monitor mounted on the acquirer head for reproducing the image framed by the telecamera or cinecamera, said television monitor following the movements imparted by the acquirer head.

5. Equipment according to claim 1, further including commutators for changing the ratio of proportion between the PAN and TILT movements of the acquirer head and the corresponding PAN and TILT movements of the actuator head.

6. Equipment according to claim 1, further including reverses for inverting, respectively, the corresponding PAN and TILT movements of the actuator head with respect to the movements of the acquirer head.

7. Equipment according to claim 1, further including a processor for recording the repeated movements of the telecamera or cinecamera.

8. A method for remote control of the movements of a telecamera or cinecamera, mounted on a motorized actuator head, in such a way that it can rotate around two axes (X', Y') at right angles to each other, of PAN and TILT respectively, which comprises imparting PAN and TILT movements to an acquirer head, and reproducing corresponding movements of the motorized actuator head, said corresponding movements being directly proportional to the imparted PAN and TILT movements, said acquirer head being a head of the fluid type, provided with plates for adjusting, respectively, the fluidity of the PAN and TILT movements, and said acquirer head being operated by means of at least a lever.

9. A method for remote control of the movements of a telecamera or cinecamera according to claim 8, further comprising providing a television monitor on said acquirer head, said television monitor following the movements imparted to said acquirer head.

10. A method according to claim 8, further comprising reading the PAN and the TILT movements imparted to the acquirer head by respective sensors, which send corresponding electrical signals for instantaneous operation of the motorized actuator head.

11. A method according to claim 10, wherein the sensors are bidirectional, incremental encoders, and the signal sent by them are two square waves offset at 90° to each other.

12. A method according to claim 8, wherein the ratio of proportion between the movements of the acquirer head and those of the motorized actuator head is variable.

13. A method according to claim 8, further comprising recording by means of a processor the repeated movements of the telecamera or cinecamera.

* * * * *